United States Patent Office 2,759,968
Patented Aug. 21, 1956

2,759,968
METHOD OF PREPARING ESTERS FROM CHLORETONE

Donald G. Kundiger and Donald D. Wheeler, Manhattan, Kans., assignors to The Dow Chemical Company, Midland, Mich., a corporation of Delaware No Drawing. Application February 2, 1953,
Serial No. 334,734

5 Claims. (Cl. 260—479)

This invention is concerned with a method of preparing useful compounds from chloretone and is particularly directed to a method for preparing aryl esters of α-chloroisobutyric acid.

According to the present invention it has been found that 1,1,1-trichloro-2-methyl-2-propanol, commonly known as chloretone, may be reacted with phenols in the presence of aluminum chloride as catalyst and at from about 20° to 170° C. to obtain as major products of reaction, the corresponding aryl α-chloroisobutyrates.

In the reaction, the chloretone may be employed in the anhydrous condition, although it is sometimes convenient to employ chloretone hemihydrate. The latter compound is commercially available and has the advantage of being relatively stable upon exposure to air. In the following specification and claims, unless otherwise specified, the expression "chloretone" is to be understood as inclusive of 1,1,1-trichloro-2-methyl-2-propanol either in the anhydrous or hemihydrated condition. The aluminum chloride is employed in the anhydrous condition.

In the practice of the invention the chloretone and phenol are mixed together and heated to the reaction temperature. The aluminum chloride catalyst is thereafter added to the above mixture portionwise with stirring. On completion of the addition of catalyst, heating of the reaction mixture is continued for a period of time to complete the reaction. Alternatively, the aluminum chloride may be mixed with the phenol and the chloretone, in molten condition, thereafter added portionwise with stirring.

The described operations are preferably carried out in a reaction vessel having an inner surface relatively resistant to attack by the hydrogen chloride developed as a product of reaction. Suitable reactor surfaces include those of glass, nickel, stainless steel, porcelain and the like. The exact equipment employed is not critical and may range from an open pot reactor with adequate facilities for the recovery of hydrogen chloride, to a system run on a continuous or semi-continuous basis with any excess of either organic reactant being recovered and recycled in the system.

The reaction proceeds satisfactorily under atmospheric pressure although pressures somewhat elevated or reduced from atmospheric may be employed if desired.

While any suitable proportions of reactants may be employed, it is preferred to use subtantially equimolecular proportions of the phenol and chloretone. When proportions other than equimolecular proportions are employed, excess unreacted reagent may be recovered upon completion of the reaction. The aluminum chloride may be employed in any suitable proportion, provided only that the amount used is sufficient to initiate and maintain the reaction to produce the desired ester product. Such a proportion may be described as a catalytic amount. Good results have been obtained when employing from 0.04 mole to 1 or more moles of anhydrous aluminum chloride per mole of the chloretone reagent.

In general, the reaction is initiated promptly and proceeds rapidly when the reactants and catalyst are brought together at a temperature within the range indicated. The reaction is exothermic and the rate of reaction increases with increase in temperature. The rate of reaction can be controlled to a considerable extent by the rate at which the reactants and catalyst are admixed. Excessive temperatures are to be avoided in order to minimize the production of tarry or other undesired by-products. While the temperature range of from about 20° to 170° C. is operable, it is preferred to carry out the reaction in the range of from 60° to 80° C.

In general, it is preferred that the admixture of reactants and catalyst be carried out at a temperature above the melting point of the phenol employed. By so operating, the maintenance of the reaction mixture in a conveniently fluid condition is assured. Alternatively the reaction medium may be maintained in a fluid condition by the addition of excess chloretone or of an inert solvent such as a non-aromatic petroleum distillate, methyl cyclohexane, carbon tetrachloride or the like. When employing higher melting phenols such as pentachlorophenol and 2,4,6-trichlorophenol, it is preferred to carry out the reaction in one of the above solvents. Upon completion of the reaction, any solvent or excess reactant may be recovered by fractional distillation.

The time required for completion of the reaction is dependent on the temperature, the reaction proceeding quite slowly at room temperature and extremely vigorously at temperatures of 80° C. and higher. In laboratory operations in the preferred temperature range good results have been obtained when allowing 1 to 3 hours for completion of the reaction.

The products of the reaction may be separated by conventional procedures. In one method of operation, the reaction product is added to a mixture of crushed ice and a strong mineral acid to decompose the aluminum chloride catalyst, the resulting mixture separating into an aqueous layer and an organic layer. The organic layer is then separated and the aqueous layer extracted with a water-immiscible organic solvent such as ether or benzene. The organic layer and the organic solvent extracts are combined and fractionally distilled to recover the solvent and any unreacted starting material and to separate the desired ester product.

Alternatively, the reaction product, if a solid, may be separated by filtration following the decomposition of the catalyst as set forth above. The resulting crude product may be further purified if desired by known methods such as absorption and recrystallization.

A preferred embodiment of the present invention consists of the described reaction as carried out with a phenol of the formula

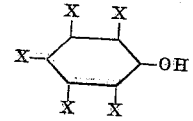

wherein each X represents hydrogen, chlorine, bromine or a lower alkyl radical.

The following examples illustrate the invention but are not to be construed as limiting the same.

*Example 1*

47 grams (0.5 mole) of phenol and 87.75 grams (0.47 mole) of chloretone hemihydrate were dissolved in 200 milliliters of petroleum ether (boiling at 70° C.). To the above mixture 100.2 grams (0.75 mole) of anhydrous aluminum chloride was added portionwise with stirring over a period of two hours, the temperature of the reaction mixture being held in the range of 25° to 30° C. by cooling as needed. Stirring was thereafter continued for an additional five hours at a temperature of from 20° to 30° C. Stirring was then discontinued and the reaction mixture allowed to stand at room temperature for eighteen hours. The reaction mixture was then poured over a mixture of 500 grams of crushed ice and 50 milliliters of concentrated hydrochloric acid, the mixture thereupon separating into an aqueous layer and an oily organic layer. The latter was separated and the aqueous layer extracted with three successive 100 milliliter portions of ether. The organic layer and ether extracts were combined, dried and submitted to fractional distillation to recover the solvents and to obtain a phenyl α-chloroisobutyrate product boiling at 66° to 67.5° C. at 0.5 millimeter pressure.

*Example 2*

141 grams (1.5 moles) of phenol and 266 grams (1.4 moles) of chloretone hemihydrate were placed in a reaction vessel and heated to 70° C. 195 grams (1.46 moles) of anhydrous aluminum chloride was added to the above mixture portionwise with stirring, the temperature of the reaction mixture being maintained at 67°–73° C. The addition of aluminum chloride was carried out over a period of one and one-half hours and thereafter the reaction mixture was maintained at 67°–73° C. for an additional three hours. The reaction mixture was poured over a mixture of 1300 grams of crushed ice and 130 milliliters of concentrated hydrochloric acid. The separation, extraction, and distillation of the product was carried out as in Example 1 to obtain a phenyl α-chloroisobutyrate product having a refractive index (n/D) of 1.503 at 20° C. The yield of this product was 23 percent of theoretical.

*Example 3*

193 grams (1.5 moles) of p-chlorophenol and 266 grams (1.5 moles) of anhydrous chloretone were heated together to a temperature of 70° C. and 200 grams (1.5 moles) of anhydrous aluminum chloride added thereto portionwise with stirring over a period of one and one-half hours. Stirring was continued thereafter and the temperature maintained at from 65° to 70° C. for an additional one and one-half hours. The crude reaction product was poured over a mixture of 1000 grams of crushed ice and 100 milliliters of concentrated hydrochloric acid. The separation, extraction, and fractional distillation were carried out as in Example 1 to obtain a p-chlorophenyl α-chloroisobutyrate product boiling at 85°–87° C. at 0.3 to 0.4 millimeter pressure. The yield of the latter product was 46.5 percent of theoretical.

*Example 4*

Following the procedure of Example 3, equimolecular proportions of 2,4-dichlorophenol (0.5 mole), anhydrous chloretone (0.5 mole) and anhydrous aluminum chloride (0.5 mole) were admixed during a period of twenty minutes and at a temperature of 70° C. The reaction mixture was maintained thereafter at a temperature of 68°–72° C. with stirring for a period of seventy minutes. The reaction mixture was poured over a mixture of 400 grams of crushed ice and 40 milliliters of concentrated hydrochloric acid. The resulting product was worked up as in the preceding examples to obtain a 2,4-dichlorophenyl α-chloroisobutyrate product boiling at 105°–107° C. under a pressure of 0.7 to 1.0 millimeter. This product was obtained in the yield of 63 percent of theoretical.

*Example 5*

59.1 grams (0.3 mole) of 2,4,6-trichlorophenol was placed in a reaction vessel and heated to 75° C. 37 grams (0.3 mole) of anhydrous aluminum chloride was added slowly to the above over a period of seventy-five minutes, the reaction vessel and contents being maintained at a temperature of 70°–80° C. 53.1 grams (0.3 mole) of molten anhydrous chloretone was added portionwise to the above mixture with stirring. Thereafter stirring was continued for one hour at a temperature of 70° C. The reaction mixture was then poured over a mixture of 240 grams of crushed ice and 24 milliliters of concentrated hydrochloric acid and the separation, extraction and fractional distillation carried out as in the preceding examples to obtain a 2,4,6-trichlorophenyl α-chloroisobutyrate product boiling at 110° to 119° C. under a pressure of 0.7 to 1.0 millimeter.

*Example 6*

In a fashion similar to that of Example 3, 66.5 grams (0.25 mole) of pentachlorophenol and 94 grams (0.53 mole) of anhydrous chloretone were reacted together in the presence of 66.75 grams (0.5 mole) of anhydrous aluminum chloride at a temperature of 100° C. On completion of the reaction, the reaction mixture was poured over a mixture of 400 grams of crushed ice and 40 milliliters of concentrated hydrochloric acid. The organic layer was separated and extraction with ether carried out as in the preceding examples. The organic layer and ether extracts were combined and filtered and the ether recovered by distillation to obtain a crude reaction product as an oily solid residue. This residue was decolorized and purified by washing, treating with activated charcoal and recrystallizing from alcohol to obtain a pentachlorophenyl α-chloroisobutyrate product as a crystalline solid, melting at 118°–119° C.

*Example 7*

121.5 grams (1.25 moles) of phenol and 43.9 grams (0.25 mole) of anhydrous chloretone were placed in a reaction vessel and heated until the mixture became liquid. To this mixture 1.35 grams (0.01 mole) of anhydrous aluminum chloride was added rapidly and the reaction vessel and contents thereafter heated to about 170° C. and maintained at such temperature under reflux for a period of 18 hours. The reaction mixture was then poured over a mixture of 10 grams of crushed ice and 10 milliliters of concentrated hydrochloric acid. From the resulting mixture, the organic materials were extracted with one 500 milliliter portion and three 100 milliliter portions of ether. The ether extracts were combined, washed with water, dried and fractionally distilled to recover solvents and unreacted starting materials and to obtain a phenyl α-chloroisobutyrate product boiling at 66° to 68° C. under 0.7 millimeter pressure. This product was obtained in a yield of 16.4 percent of theoretical.

In a similar fashion, p-bromophenol and 2,4-dibromophenol are reacted with equimolecular proportions of chloretone in the presence of anhydrous aluminum chloride to produce p-bromophenyl α-chloroisobutyrate and 2,4-dibromophenyl α-chloroisobutyrate respectively.

The aryl α-chloroisobutyrates as prepared by the method of the present invention are useful as intermediates in the preparation of more complex organic compounds and as active toxic ingredients in disinfectant compositions for the control of fungal organisms.

We claim:
1. A method for preparing aryl esters of α-chloroisobutyric acid which comprises reacting chloretone with a phenol in the presence of a catalytic amount of aluminum chloride and at a temperature of from about 20° C. to about 170° C.

2. A method according to claim 1 in which the phenol has the formula

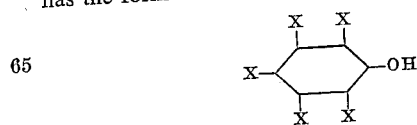

wherein each X is selected from the group consisting of hydrogen, chlorine, and bromine.

3. A method according to claim 1 in which the reaction is carried out at a temperature of from about 60° to 80° C.

4. A method according to claim 1 in which the aluminum chloride is employed in the proportions of from 0.04 to 1 mole per mole of chloretone used in the reaction.

5. A method for preparing aryl esters of α-chloroisobutyric acid which comprises reacting chloretone with a phenol in the presence of a catalytic amount of aluminum chloride and at a temperature of from about 20° C. to about 170° C. and thereafter isolating from the reaction mixture an aryl α-chloroisobutyrate.

References Cited in the file of this patent

UNITED STATES PATENTS

| | | |
|---|---|---|
| 2,048,465 | Reiff | July 21, 1936 |
| 2,138,809 | Reiff | Nov. 29, 1938 |

OTHER REFERENCES

Beilstein: Band I (1918), page 383.
Beilstein: Band VI (1923), pp. 153, 196.
Thomas: Anhyd. Aluminum Chloride, Reinhold (1941), pp. 358, 359, 774.
Beilstein: Band VI (1944), Sup. p. 154.